May 9, 1961  J. DAUGHERTY  2,983,199
MACHINE TOOL COUNTER-BALANCE
Filed May 29, 1957  4 Sheets-Sheet 1

INVENTOR
JESSE DAUGHERTY
BY Carlson, Pitzner, Hubbard & Wolfe
ATTYS.

May 9, 1961 J. DAUGHERTY 2,983,199
MACHINE TOOL COUNTER-BALANCE
Filed May 29, 1957 4 Sheets-Sheet 2

INVENTOR
JESSE DAUGHERTY
BY Carlson, Pitzner, Hubbard & Wolfe
ATTYS.

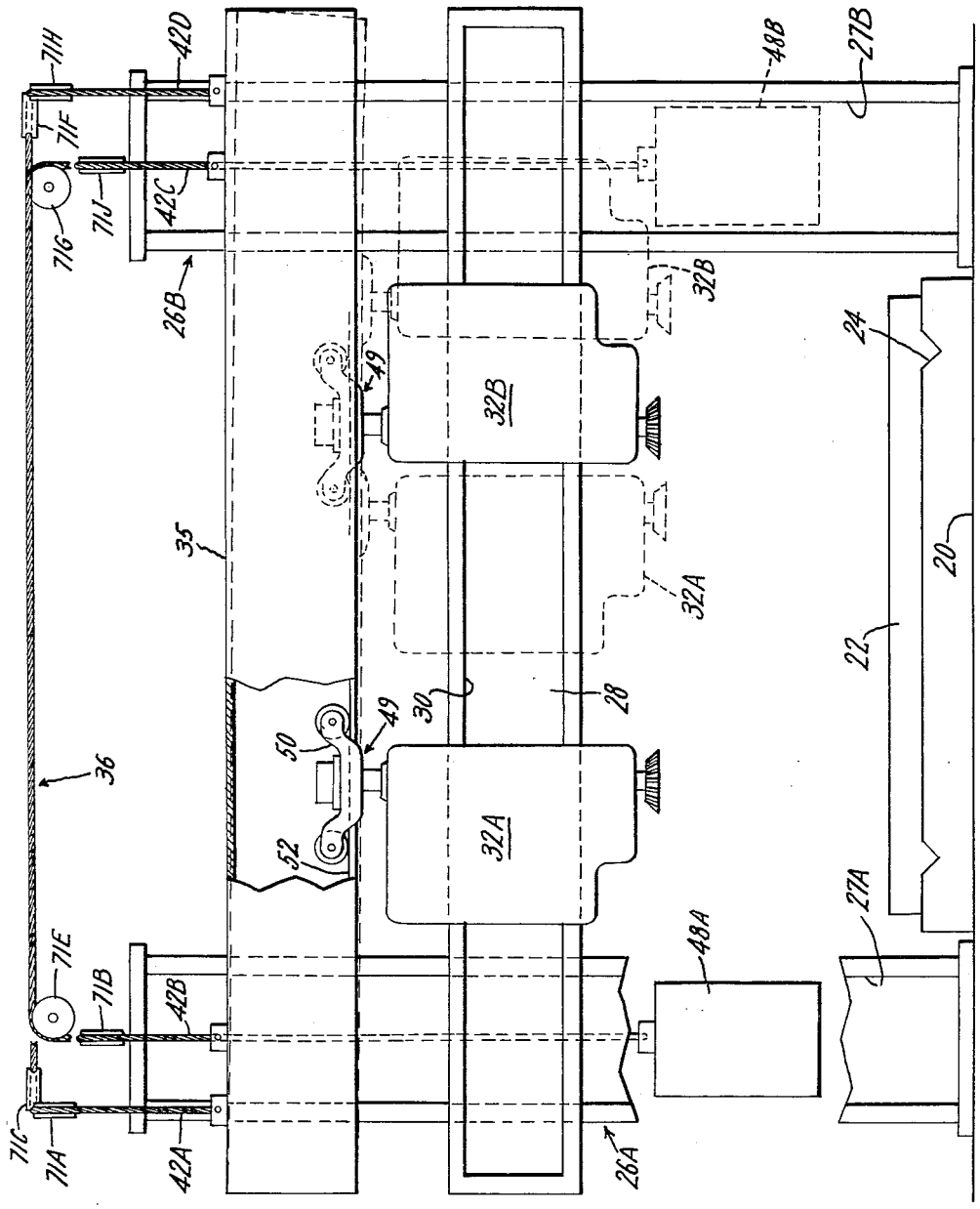

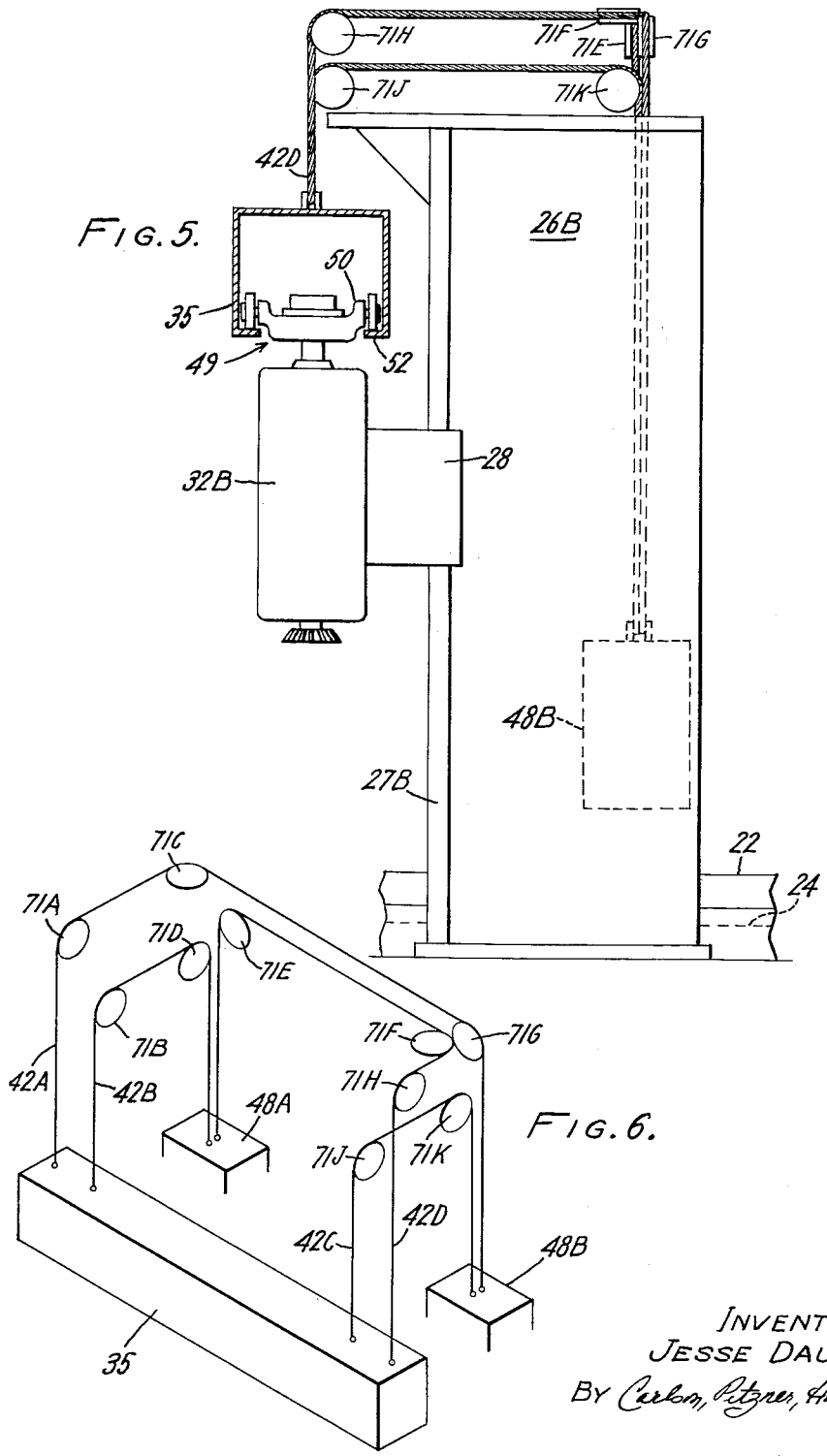

United States Patent Office 2,983,199
Patented May 9, 1961

2,983,199
MACHINE TOOL COUNTER-BALANCE

Jesse Daugherty, Fond du Lac, Wis., assignor to Giddings & Lewis Machine Tool Company, Fond du Lac, Wis., a corporation of Wisconsin Filed May 29, 1957, Ser. No. 662,498

10 Claims. (Cl. 90—15)

The present invention relates generally to counter-balance systems for machine tools. More particularly, the invention relates to a mechanical suspension mechanism for the movable headstocks of relatively large machine tools.

A significant factor in the construction and manufacture of large machine tools is maintaining headstock alinement under operating conditions. Heretofore, in large machine tools relatively serious alinement problems have been presented when the headstock must be mounted off-center and in overhanging relationship with respect to its supporting structure in order to properly position the headstock for machining a workpiece. A relatively recent development in the art of machine tools has been a planer type milling machine especially adapted for the milling of aircraft skin, called a "skin mill." In this type machine the problem of counter-balancing the headstocks is particularly acute due to the weight of the headstocks which may each weigh as much as 6,000 or 7,000 pounds. Numerous headstock suspension systems have been tried in this relatively new machine, with varying degrees of success. One such suspension system is shown in my Patent No. 2,696,763, wherein the headstocks of the machine are individually counter-balanced. As the development of the "skin mill" advanced, the machine tool was made gradually more complex. With this increased complexity came an increase in the number of service and control lines required for the movable machine elements or headstocks, and means for feeding these lines constructed as an integral part of the machine tool structure came as a concomitant development. The unitary multiple line feed for this purpose is described and claimed in my co-pending application Serial No. 238,295, filed July 24, 1951, now Patent No. 2,892,388, issued June 30, 1959.

The multiple line feed for a "skin mill" machine tool as disclosed in the aforementioned patent application is embodied in a beam structure which is suspended from the upright columns of the machine to be positioned substantially coextensive with the cross-rail. The movable headstocks ars suspended from the beam in a manner that permits their movement along the beam from one end to the other. One suspension system for counter-balancing the headstocks and the beam housed multiple line feed of such a "skin mill," is described and claimed in my co-pending application, Serial No. 532,172, filed September 2, 1955, now Patent No. 2,899,869, issued August 18, 1959, wherein the headstocks are counter-balanced not individually as in the manner of my Patent No. 2,696,763, but rather as part of a massive structure including the beam containing the multiple line feed. In this arrangement the beam is counter-balanced at each end. As the headstocks or movable machine elements shift along the cross-rail and from one end to the other of the beam, the center of gravity thereof shifts horizontally with respect to the column structure. A shift in the center of gravity may also be the result of a twisting or tilting of the headstocks developed during machining, or may be due to other causes. The counter-balancing forces applied to each end of the beam are varied in accordance with the shifting of the center of gravity along the beam by means of a control system which measures any deviation from the horizontal of the beam structure. This control system is then effective automatically to apply the required counter-balancing forces to the suspension elements to correct the deviation.

The principal object of this invention is to provide an improved counter-balance system for the headstocks of a machine tool. In a more detailed aspect it is an object of this invention to provide an improved counter-balance system for the headstocks and beam of the planer type milling machine known as the "skin mill." In brief, under a preferred arrangement the headstocks are suspended by spaced suspension elements positioned at the limits of horizontal movement of the center of gravity of the headstocks. It is an object of this invention to provide for mechanically dividing the required lifting or counter-balancing force between the suspension elements in accordance with the distribution of headstock weight as determined by the horizontal position of the headstock center of gravity. It is an object of this invention to provide this result by a suspension system devoid of a separate control system and wherein the suspension mechanism itself functions to divide the counter-balance forces between the spaced suspension elements as required for maintaining headstock alinement.

In a more specific aspect, it is an object of this invention to provide a torque tube suspension mechanism which mechanically divides the required lifting force between the suspension elements and maintains headstock alinement.

In another of its more detailed aspects, it is an object to provide a double cable arrangement effective to obtain this result.

Another object is to provide a mechanical suspension system wherein a plurality of counter-balances are used so as to reduce the stresses normally registered in the suspension elements extending between the counter-balances and the headstock structure.

Other objects of the invention will be apparent from the following detail description taken in connection with the accompanying drawings, wherein:

Fig. 4 is a front elevational view of an illustrative planer-type skin milling machine embodying an alternative form of the invention;

Fig. 5 is a side elevational view of the machine of Fig. 4; and

Fig. 6 is a schematic view of the suspension system of Figs. 4 and 5.

Figure 1:
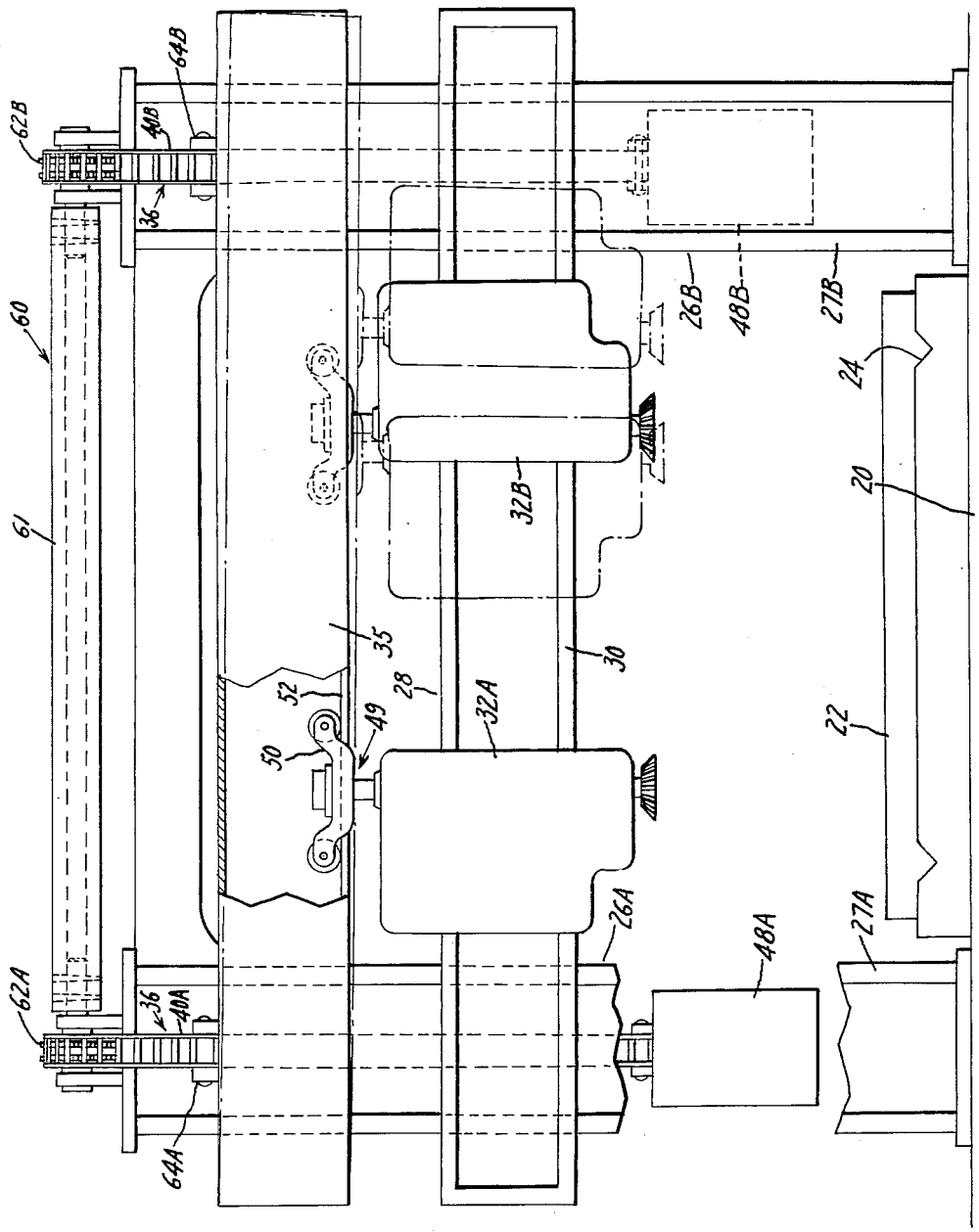
Figure 1 is a front elevational view of an illustrative planer-type skin milling machine embodying the presnet invention.

While the invention is susceptible of various modifications and alternative constructions, preferred embodiments thereof have been shown in the drawings and will be described below in detail. It should be understood, however, that there is no intention to limit the invention to the specific forms disclosed, but, on the contrary, the invention is to cover all modifications, alternative constructions and equivalents falling within the spirit and scope of the invention as expressed in the appended claims.

General machine organization

Turning now to the drawings, and particularly to Figures 1 and 4, the planer-type skin milling machine or "skin mill" in which the invention is embodied for purposes of illustration, is of a complex nature and since the invention is primarily concerned with counter-balancing the headstocks of the machine, only such parts of the machine structure are disclosed as are pertinent to the operation of the suspension mechanism used for this purpose. Insofar as practicable, the disclosure of the machine tool structure has been of a schematic nature. The planer-type skin milling machine, as shown in Figure 1, involves a main base or bed 20 on which a work supporting table 22 is mounted for rectilinear movement by means of ways 24. This table is of such a size as to support slabs or plates for machining aircraft surface sections, for example, a wing or tail section, and has a work area roughly 10 feet wide by 34 feet long in the machine depicted. A pair of columns or housings 26A, B extend upwardly from opposite sides of the bed 20 intermediate the ends thereof and are provided with guide ways 27A, B on their outer faces for supporting and guiding a vertically movable cross-rail 28. The cross-rail 28 is in turn provided with horizontal guide ways 30 for slidably supporting and guiding the headstocks 32A, B for translation in a horizontal path. These headstocks may be varied as to type and size, however they have been made as 100 H.P., A.-C. motor driven heads having spindle speeds of between 1200–3600 r.p.m. In the machine shown, the work table feeds past the headstocks at a feed rate of up to 150 inches per minute. Furthermore, in order to machine the required contours, the individual headstocks may be movable vertically on slides or saddles, as well as horizontally on the cross-rail, and the headstock and table movements are synchronized by a control system.

Alternative forms of the suspension mechanism of this invention are shown in the drawings in Figures 1 and 4, respectively. In both of the machines illustrated in these figures, the cross-rail 28 is employed for mounting the headstocks. A beam 35 overlying the cross-rail is used both for the purpose of supporting a multiple line feed for the headstocks and for counter-balancing purposes. For the latter purposes, the beam is suspended from the upright columns by means of suspension elements 36, which are attached to the beam 35 at its ends. In the illustrative machine shown in Figure 1, the suspension elements are roller chains 40A, B while in the illustrative machine of Figure 4, the suspension elements are cables 42A–D. Other types of lines may be substituted for these suspension elements so long as they satisfy the operational requirements of the suspension mechanisms, as pointed out hereinafter. In general, each suspension element is fastened to the beam 35, then trained over guides on the upper extremities of the machine columns 26A, B and eventually fastened to counter-balances 48A, B mounted within the machine columns. In both cases the headstock assemblies are suspended from the beam by an assembly 49 including a trolley 50 adapted to roll along tracks 52 forming a part of the beam. A preferred mounting assembly 49 includes some means for accommodating deflection of the beam 35, and resultant change in the clearance between the headstock and beam. Such an assembly is shown in my copending application Serial No. 532,172, filed September 2, 1955, now Patent No. 2,899,869.

*The counter-balance systems*

Figure 2:
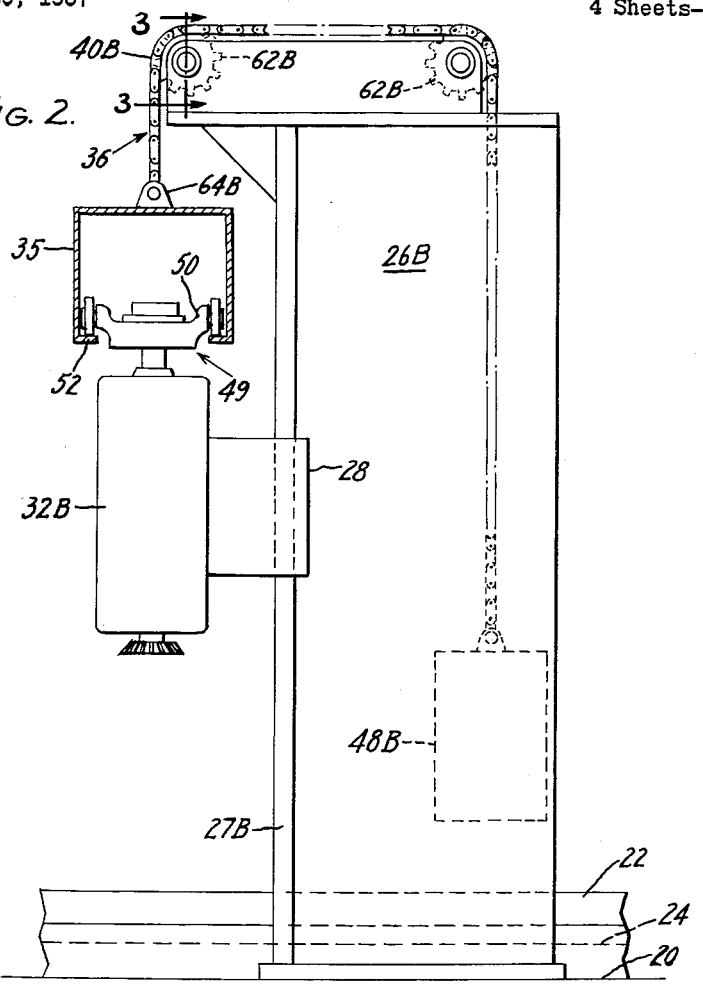
Fig. 2 is a side elevational view of the machine of Figure 1.
Figure 3:
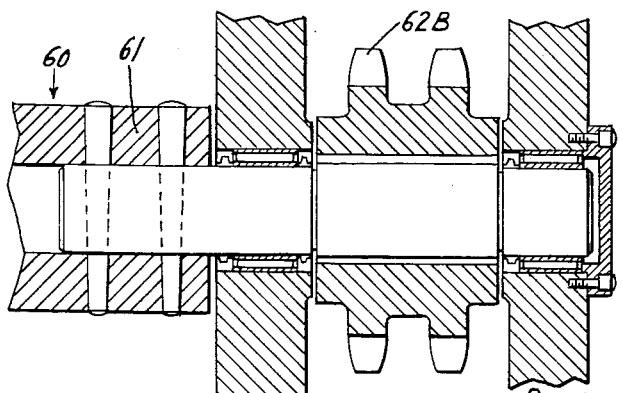
Fig. 3 is an enlarged fragmentary, vertical sectional view taken substantially in the plane of lines 3—3 of Fig. 2.

Referring particularly to Figures 1–3, there is shown a preferred suspension mechanism for carrying out the present invention. It includes a torque tube mechanism 60 having a horizontal torque tube 61 which extends between the columns 26A, B. Also included are sprockets 62A, B at each end of the torque tube 61 for connecting the roller chains or suspension elements 40A, B thereto. Arranged on the upper side of the beam 35 from which the headstocks 32A, B are suspended are lugs 64A, B by means of which the individual suspension elements are fastened to the beam. Preferably the suspension elements are coupled to the torque tube 61 in such a manner that the tension in these suspension elements is transmitted to the torque tube tending to twist it. Thus the torque tube is preferably coupled directly to both suspension elements in a way that permits of no slippage.

For the purpose of counter-balancing the beam and headstocks, the suspension elements 36 are trained over the sprockets 62A, B which are part of the torque tube mechanism 60 and extend to be fastened, at a point remote from the beam, to counter-balance 48A, B which in the present instance are weights mounted within the upright columns 26A, B of the machine tool. The term "counter-balance" as used herein is intended to mean a counter-weight or any equivalent system for developing counter-balance force and applying it to the suspension mechanism such as by a motor either hydraulic or electric, or by any other means well known in the art.

In accordance with one aspect of the invention, the torque tube mechanism is effective mechanically to divide the requisite counter-balance force between the suspension elements in accordance with the distribution of headstock weight along the beam as determined by the horizontal position of the headstocks. Referring to Figure 1, for example, with the headstocks 32A, B positioned as shown in solid lines, assuming each to weigh substantially the same, the arrangement is symmetrical and the suspension elements 36 transmit substantially equal force to counter-balance the headstocks and beam 35 and relieve the cross-rail 28 from the weight of the same. On the other hand, with the headstocks both shifted to one or the other end of the beam, for example, with the headstocks in the chain line positions depicted in this same figure, a condition of unbalance is created which might cause the beam to assume the non-level position shown in chain lines unless the counter-balance forces transmitted through the suspension elements to the ends of the beam are varied to take into account the unbalanced condition. Heretofore, to prevent headstock weight shift from resulting in the beam sagging at one end and rising at the other, it has been proposed to employ a control system which applies a corrective lifting force to the heavy end of the beam and decreases the lifting force applied to the lighter end of the beam. Such a system is disclosed in my patent application entitled Suspension Mechanism for Machine Tools, Serial No. 532,172, filed September 2, 1955, now Patent No. 2,899,869.

With the present torque tube mechanism, no control system is employed but rather the mechanical connection afforded by the torque tube divides the total counter-balance force from the pair of counter-balances between the suspension elements. Thus, the counter-balance member which is fastened to the suspension element connected at the lighter end of the beam, through the torque tube, supplies the requisite additional counter-balancing force which when added to the force supplied by the counter-balance member at that end of the beam is sufficient to support the heavy end of the beam and prevent it from sagging. At the same time, the force transmitted by the suspension element to the beam at the lighter end is decreased by a corresponding amount. The expression "torque tube" as used herein is intended to embrace an equivalent torsion bar or like structure which may be employed for performing the function of the torque tube in the suspension mechanism.

It will be noted that the result sought by the invention, of mechanically dividing the counterbalancing force, is achieved with the construction and arrangement illustrated with the headstocks positioned over the table, when the counterbalancing effect is most needed to reduce headstock positional deviations tending to produce machining accuracies. The result sought is thus achieved for headstock travel between limits defined by the suspension elements, which are located at the sides of the table.

Referring now to Figs. 4–6, there is shown a preferred suspension system for carrying out an alternative form of the present invention. This suspension system includes a pair of counter-balances 48A, B, one for each of the machine tool columns. Arranged at the top of the machine tool column structure are a plurality of pulley sheaves 71A–K over which are trained suspension elements in the form of the cables or lines 42A–D connected to the counter-balances and to the beam 35 from which the headstocks 32A, B are suspended.

In keeping with the invention, to each end of the beam a pair of cables is fastened, one each of the pair of cables being trained over the pulley sheaves for connection to each of the counter-balances. Thus each end of the beam is connected by means of suspension elements to both the counter-balances. In the present instance, in accordance with the invetion the result is obtained that the counter-balance force is mechanically divided between the suspension elements in accordance with the distribution of headstock weight along the beam as determined by the horizontal positions of the headstocks.

For example, referring to Figs. 4 and 6, with the headstocks 32A, B arranged symmetrically as shown in solid lines in Fig. 4, the plurality of cables 42A–D, four as depicted, share equally in transmitting counter-balance force to the beam. The lifting force obtained from each cable or "suspension element" is the same; similarly, the force applied to each end of the beam 35 is the same, divided equally between two cables, one of which is fastened to one counter-balance and the other of which is fastened to the other counter-balance. But, with the headstocks shifted to one end of the beam as shown in dotted lines in Fig. 4, a condition of unbalance is created wherein the weight is concentrated at the right-hand end of the beam. Such an effect has the result, in the absence of a corrective division of lifting force applied by the suspension elements, that the heavier end of the beam sags and the lighter end rises. With the present arrangement, the counter-balance force obtained from the two counter-balances is automatically divided between the cables suspending the beam, in accordance with the distribtuion of headstock weight along the beam. In other words, referring to Fig. 6, since neither the weight to be counter-balanced, nor the counter-balance weight changes, the system remains in static equilibrium. Therefore, any tendency of the lighter end of the beam to rise reduces the tension in the lines or cables connected to that end of the beam. A decerase in tension in one of the pair of cables connected to a given counter-balance results in a corresponding increase in tension in the remaining cable. This has the result of applying an increased lifting force to the heavy end of the beam such as to maintain the beam level.

A number of practical considerations enter into the construction of a counter-balance system embodying the present invention. For example, in the counter-balance system of Figs. 4–6, the cables or lines 72A–D may stretch a substantial amount depending on line tension and the mechanical specifications of the cables used. To prevent excessive cable stretch toggle bolts or equivalent adjusting mechanisms may be added to the lines. Furthermore, referring to Figs. 4 and 5, it is noted that the individual cables 72A–D are tied to each of the counter-balances 70A, B at substantially the same point, directly over the center of gravity of the counter-balance weights, to insure that each counter-balance weight is equally effective on all the cables connected thereto. In the arrangements depicted in the drawings, the counter-balance weights are shown suspended freely, although as will be evident to a man skilled in the art if weights are used slides or guides for the weights are preferably to be included along with means for insuring proper transmission of the counter-balance forces to the suspension elements.

I claim as my invention:

1. In a headstock suspension mechanism for use with a machine tool having an upright member and a headstock mounted thereon for vertical movement, said headstock having a center of gravity shiftable horizontally relative to the upright member, the combination comprising, a beam suspended from the upright member so as to be positioned adjacent the path of horizontal movement of the center of gravity of the headstock, means for supporting the headstock from the beam, a pair of spaced elements secured to the beam and suspending the same from the upright member, said suspension elements being positioned outwardly of the limits of the horizontal movement of the center of gravity of the headstock, and means for counter-balancing the headstock and beam including at least one counter-balance member, and means fixing both said suspension elements at a point remote from said beam to each said counter-balance member for dividing the counter-balancing force between the suspension elements in accordance with the distribution of headstock weight along the beam as determined by the horizontal position of the center of gravity of the headstock.

2. In a headstock suspension mechanism for use with a machine tool having a pair of spaced upright columns, a cross-rail extending between the columns and vertically movable thereon, and a headstock mounted for horizontal movement along the cross-rail, the combination comprising, a beam spanning the columns and positioned adjacent the cross-rail for carrying the weight of the headstock and relieving the cross-rail from bearing the weight of the same, means for suspending the headstock from said beam for movement therealong, and means for counter-balancing the headstock and beam comprising, a pair of counter-balances, a torque tube mechanism supported at the top of said columns above said beam, said mechanism including a torque tube extending between said columns, a sprocket at each end of said torque tube, and chains trained over said sprockets and leading to one end of said beam so as to apply torque to the tube at each end due to the weight of the beam and headstock, and means connecting each of said chains to one of said pair of counter-balances so as to oppose said torque.

3. In a headstock suspension mechanism for use with a machine tool having an upright member and a headstock mounted thereon for vertical movement, said headstock having a center of gravity shiftable horizontally relative to the upright member, the combination comprising, means for suspending the headstock from the upright member including a pair of spaced suspension elements positioned outwardly of the limits of the horizontal movement of the center of gravity of the headstock, and means for counter-balancing the headstock including a counter-balance, a torque tube mechanism supported above said headstock by said upright member, said mechanism including a torque tube connected at each end to one of said suspension elements so that torque is applied to the tube due to the weight of the beam and headstock, means for connecting said counter-balance to said torque tube, so as to oppose the torque applied to the tube by the suspension elements whereby the counter-balancing force is transmitted through said torque tube to said suspension elements in accordance with the distribution of headstock weight as determined by the horizontal position of the center of gravity of the headstock relative to the upright member.

4. In a headstock suspension mechanism for use with a machine tool having a pair of spaced upright columns, a cross-rail spanning the columns and vertically movable thereon, and a headstock mounted for horizontal movement along the cross-rail, the combination comprising, a beam spanning the columns and positioned adjacent the cross-rail for carrying the weight of the headstock, means for supporting the headstock from the beam for horizontal movement therealong, means for suspending the weight of said beam and headstock from said columns including a pair of suspension elements connected to each end of said beam, a pair of counter-balance members mounted in the vertical columns respectively, guide elements supported at the top of each of said columns, and means fixing one element of each pair at a point remote from said beam to each counter-balance member, said suspension elements comprising lines trained over said guide elements and connected to the beam and one of said counter-balance members respectively, whereby the counter-balancing force is mechanically divided and transmitted to each end of the beam in accordance with the distribution of headstock weight along the beam as determined by the horizontal position of the headstock.

5. In a headstock suspension mechanism for use with a machine tool having a pair of spaced upright columns, a cross-rail extending between the columns and vertically movable thereon, and a headstock mounted for horizontal movement along the cross-rail, the combination comprising, a beam spanning the columns substantially coextensive with the cross-rail for carrying the weight of the headstock, means for supporting the headstock from the beam for horizontal movement therealong and for supporting the weight of the headstock, a pair of suspension elements spaced apart and secured to the beam for suspending the same from the upright member, said suspension elements being positioned adjacent the ends of the beam, and a counter-balance member connected to both said suspension elements at the end of the latter remote from said beam, said suspension system including guide elements, supported by each of said columns, over which said suspension elements are trained in extending between the ends of the beam and the counter-balance member, whereby the counter-balancing force is mechanically divided between the suspension elements and transmitted to each end of the beam in accordance with the distribution of headstock weight along the beam as determined by the horizontal position of the headstock.

6. In a headstock suspension mechanism for use with a machine tool having a pair of spaced upright columns, a cross-rail extending between the columns and vertically movable thereon, and a headstock mounted for horizontal movement along the cross-rail, the combination comprising, a beam spanning the columns substantially coextensive with the cross-rail for carrying the weight of the headstock and relieving the cross-rail from bearing the weight of the same, means for suspending the headstock from said beam for horizontal movement therealong, a pair of counter-balances, and means connecting each of said counter-balances to both ends of the beam for transmitting counter-balancing forces to the beam, said last-named means comprising pulley sheaves mounted on the top of the upright columns, a pair of cables fastened to each end of the beam and trained over said sheaves, and means fixing one cable of each pair at the end remote from said beam to each of said counter-balances whereby the counter-balancing force obtained from each counter-balance is mechanically divided and applied to each end of the beam in accordance with the distribution of headstock weight along the beam.

7. In a headstock suspension mechanism for use with a machine tool having an upright member and a headstock having a center of gravity shiftable horizontally relative to the upright member, the combination comprising, means for suspending the headstock from the upright member including a pair of spaced suspension elements positioned outwardly of the limits of the horizontal movement of the center of gravity of the headstock, a torque tube supported above said headstock by said upright member, means at each end of said torque tube for connecting said suspension elements so as to apply torque to the tube due to the weight of the headstock and means for applying counter-balancing force to said torque tube so as to oppose the torque applied to the tube by the suspension elements, whereby said torque tube is effective for transmitting counter-balancing force to tension said suspension elements in proportion to the headstock weight carried thereby.

8. In a headstock suspension mechanism for use with a machine tool having an upright member and a headstock having a center of gravity shiftable horizontally relative to the upright member, the combination comprising, means for suspending the headstock from the upright member including a pair of spaced suspension elements positioned outwardly of the limits of the horizontal movement of the center of gravity of the headstock, and means for counter-balancing the headstock including a torque tube mechanism supported above said headstock by said upright member, said mechanism including a torque tube, means at each end of said torque tube for connecting said suspension elements so as to apply torque to the tube due to the weight of the headstock, and a counter-balance member connected to said torque tube so as to oppose the torque applied to the torque tube by the suspension elements, whereby said torque tube transmits counter-balancing force to said suspension elements in accordance with the distribution of headstock weight as determined by the horizontal position of the center of gravity of the headstock relative to the upright member.

9. In a headstock suspension mechanism for use with a machine tool having a pair of spaced upright columns, a cross-rail extending between the columns and vertically movable thereon, and a headstock mounted for horizontal movement along the cross-rail, the combination comprising, a beam spanning the columns and positioned over the cross-rail for carrying the weight of the headstock, means for suspending the headstock from said beam for horizontal movement therealong, and means for counter-balancing the headstock and beam including a suspension element secured to each end of the beam, a counter-balance member, a torque tube spanning the columns, means at each end of said torque tube for connecting said suspension elements to apply torque to the tube in one direction due to the weight of the beam and headstock, and means connecting said counter-balance member to said torque tube so as to oppose the torque applied to the tube by the suspension elements whereby the counter-balancing force transmitted to each suspension element varies according to the distribution of headstock weight along the beam as determined by the horizontal position of the headstock.

10. In a headstock suspension mechanism for use with a machine tool having an upright column, and headstock means having a center of gravity shiftable horizontally relative to the upright member, the combination comprising, means for suspending said headstock means from the upright member including spaced suspension lines carried by said upright column and positioned outwardly of the limits of the horizontal movement of the center of gravity of the headstock, a counter-balance member, and means fixing both said suspension lines at a point remote from said headstock means to said counter-balance member whereby the counter-balancing force exerted by the member is mechanically divided between said suspension lines in proportion to the headstock weight carried thereby, the weight carried by said suspension lines varying according to the distribution of headstock weight as determined by the horizontal position of the center of gravity of said headstock means.

References Cited in the file of this patent

UNITED STATES PATENTS

| 1,710,442 | Warshaw | Apr. 23, 1929 |
| 2,393,696 | Kraut et al. | Jan. 29, 1946 |
| 2,457,468 | Hercik | Dec. 28, 1948 |
| 2,696,763 | Daugherty et al. | Dec. 14, 1954 |
| 2,759,378 | Youssoufian et al. | Aug. 21, 1956 |

FOREIGN PATENTS

| 510,647 | Germany | Oct. 21, 1930 |